(12) United States Patent
Ormsbee et al.

(10) Patent No.: US 11,269,125 B1
(45) Date of Patent: Mar. 8, 2022

(54) SYSTEMS AND METHODS FOR A STRING LIGHTING APPARATUS

(71) Applicant: Nite Ize, Inc., Boulder, CO (US)

(72) Inventors: Bowden Ormsbee, Longmont, CO (US); Dale Karacostas, Boulder, CO (US)

(73) Assignee: NITE IZE, INC., Boulder, CO (US)

( * ) Notice: Subject to any disclaimer, the term of this patent is extended or adjusted under 35 U.S.C. 154(b) by 0 days.

(21) Appl. No.: 17/119,908

(22) Filed: Dec. 11, 2020

(51) Int. Cl.
| | |
|---|---|
| *F21V 8/00* | (2006.01) |
| *F21V 21/14* | (2006.01) |
| *F21L 4/08* | (2006.01) |
| *F21Y 115/10* | (2016.01) |

(52) U.S. Cl.
CPC ............... *G02B 6/001* (2013.01); *F21L 4/08* (2013.01); *F21V 21/145* (2013.01); *G02B 6/0006* (2013.01); *F21Y 2115/10* (2016.08)

(58) Field of Classification Search
None
See application file for complete search history.

(56) References Cited

U.S. PATENT DOCUMENTS

| 10,969,066 | B1* | 4/2021 | Ormsbee | F21L 14/026 |
|---|---|---|---|---|
| 2007/0019398 | A1* | 1/2007 | Chen | F16M 13/04 |
| | | | | 362/102 |
| 2007/0121332 | A1* | 5/2007 | Liu | G02B 6/0006 |
| | | | | 362/459 |
| 2011/0286217 | A1* | 11/2011 | Martinson | B65D 63/00 |
| | | | | 362/253 |
| 2012/0257377 | A1* | 10/2012 | Schrimmer | F21L 4/027 |
| | | | | 362/119 |
| 2012/0275142 | A1* | 11/2012 | Lundy | F21L 4/027 |
| | | | | 362/184 |
| 2016/0111903 | A1* | 4/2016 | Miller | H02J 7/0027 |
| | | | | 362/183 |
| 2016/0245503 | A1* | 8/2016 | Benedict | F21V 23/008 |
| 2020/0158301 | A1* | 5/2020 | Scott | F21V 1/06 |

* cited by examiner

*Primary Examiner* — Britt D Hanley
(74) *Attorney, Agent, or Firm* — Haynes and Boone, LLP

(57) ABSTRACT

A lighting apparatus includes a flexible rod having a long length in relation to a width of the flexible rod. The lighting apparatus further includes a support, running the long length of the flexible rod. The lighting apparatus further includes a lighting module interconnected with the flexible rod and the support, the lighting module including a light source, the light source oriented to project light down the flexible rod.

21 Claims, 8 Drawing Sheets

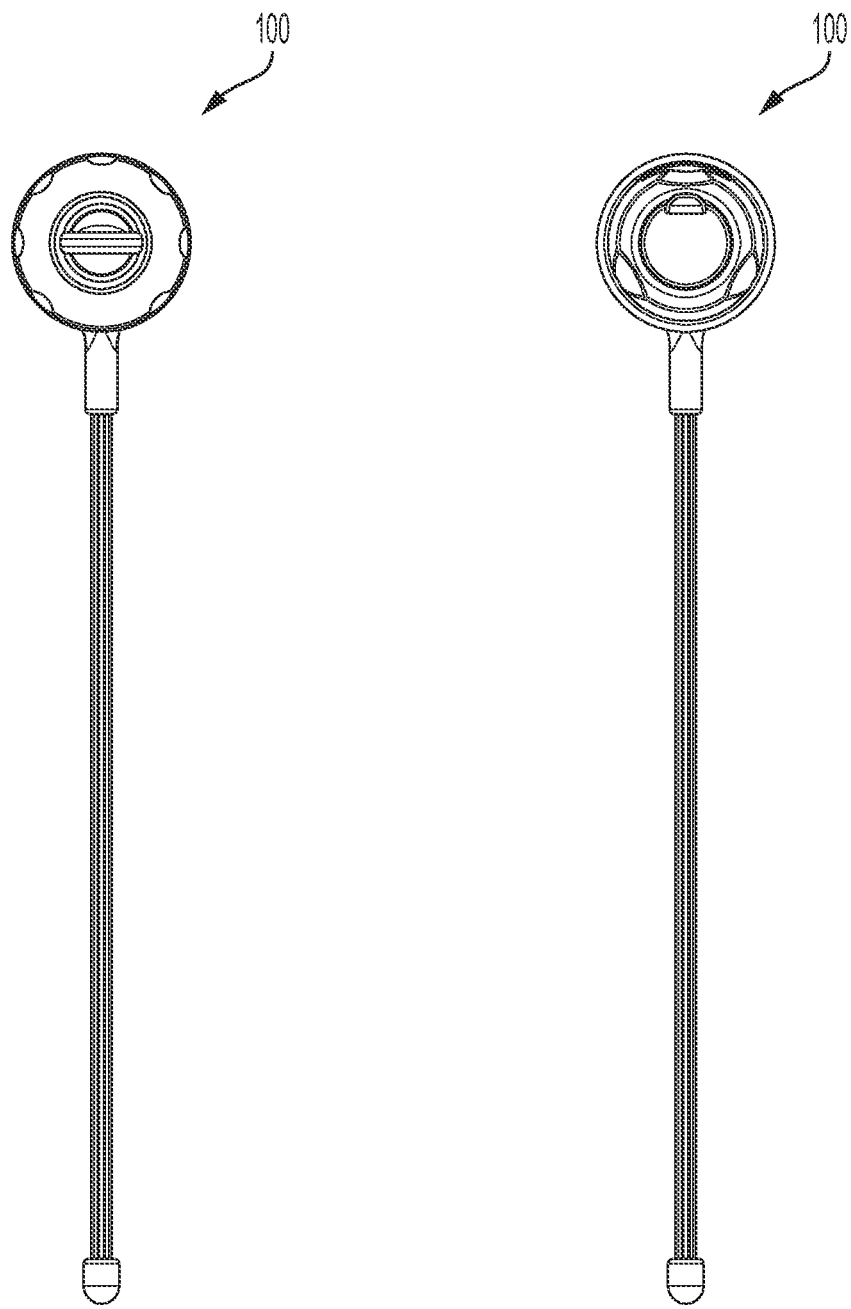

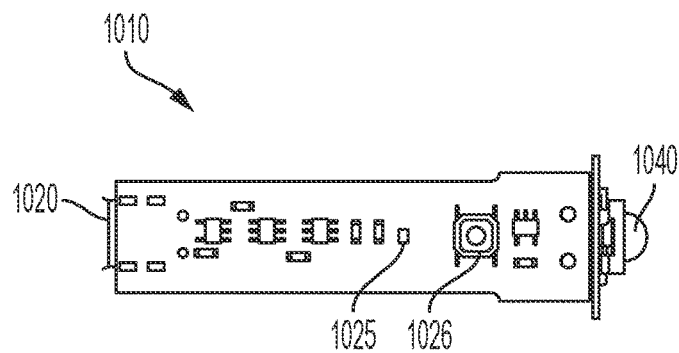
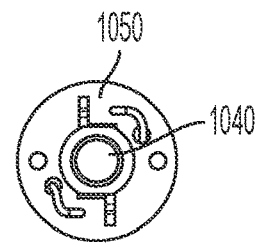
FIG. 10A  FIG. 10E
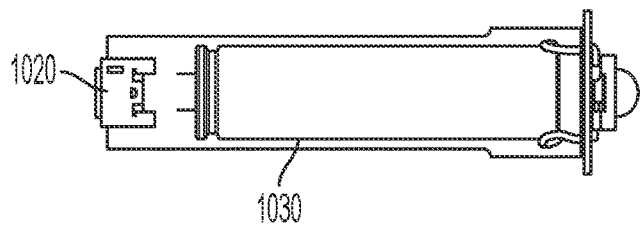
FIG. 10B
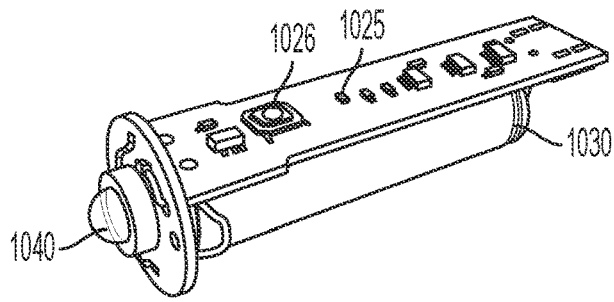
FIG. 10C
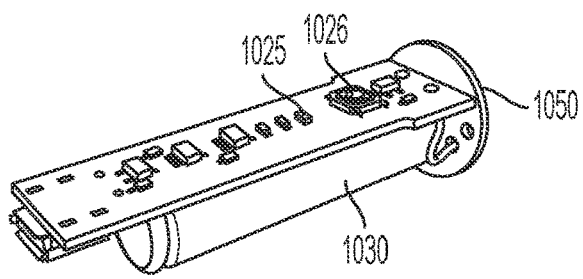
FIG. 10D

SYSTEMS AND METHODS FOR A STRING LIGHTING APPARATUS

BACKGROUND

In many scenarios, it is desirable to have an attachable lighting device that is portable and will light a large area. In a specific scenario, it may be desirable to attach a portable light over an elongated area, in a removable fashion. This scenario may arise in the case of a tent, cabin, pergola, or other structure.

BRIEF SUMMARY

In one embodiment, a lighting system includes a light source and rod interconnected with the light source. The lighting system further includes a support located outside of the rod, providing strength to the rod and light scattering of light provided by the light source. In one alternative, a first end of the rod is connected to a first interconnection device and a second end of the rod is connected to the light source. In another alternative, the light source is housed in a body portion and the body portion includes a second interconnection device. Alternatively, the first interconnection device is a ring. In another alternative, the second interconnection device is a rubberized twist tie. In another alternative, the lighting system further includes a rubberized twist tie located on the rod. Alternatively, the rod is flexible. In another alternative, the body portion includes a recharging port. In another alternative, the support is a woven nylon support that is flexible and stretches. Alternatively, the body includes a pressure fit system that captures the rod and the support holding the rod and the support in place. In another alternative, the first interconnection device includes a pressure fit system that captures the rod and the support holding the rod and the support in place. In another alternative, a first and second piece of shrink fit material surround and seal the rod and support to the body and first interconnection device. Alternatively, the lighting device is an LED, and the LED has a predominate direction of light emission, the predominate direction of light emission aligned with a length of the rod.

In one embodiment, a method of lighting an area includes providing a lighting device, the lighting device having a light source; a rod interconnected with the light source; and a support located outside of the rod, providing strength to the rod and light scattering of light provided by the light source. The method further includes stretching the rod along an area to be lit. The method further includes interconnecting the rod to a support along the area to be lit. In one alternative, the lighting device further includes an interconnection ring and a rubberized twist tie, the interconnection ring located on a first end of the rod and the rubberized twist tie interconnected to a body housing the light source. The method further includes using the ring and the rubberized twist tie to perform the interconnecting.

In one embodiment, a lighting apparatus includes a flexible rod having a long length in relation to a width of the flexible rod. The lighting apparatus further includes a support, running the long length of the flexible rod. The lighting apparatus further includes a lighting module interconnected with the flexible rod and the support, the lighting module including a light source, the light source oriented to project light down the flexible rod. In one alternative, the lighting module includes a battery and a charging port, the battery for powering the light source. In another alternative, the lighting module captures the flexible rod and the support using a pressure fit system, providing a first and second ridge piece squeezing together to capture the flexible rod and the support. In another alternative, the lighting apparatus further includes a first interconnector and a second interconnector, the first interconnector located a first end of the flexible rod and the second interconnector located on the lighting module. Alternatively, the support made of woven material, the woven material providing support to the rod and scattering light from the light source. In another alternative, the flexible rod is permeable to light.

BRIEF DESCRIPTION OF THE DRAWINGS

FIG. 2 shows a front view of the lighting system of FIG. 1;

FIG. 3 shows a rear view of lighting system of FIG. 1;

FIGS. 10A, 10B, 10C, 10D, and 10E show a top view, a bottom view, a front perspective view, a rear perspective view, and a front view, respectively, of an internal light source for use with the lighting system of FIG. 1.

DETAILED DESCRIPTION

Certain terminology is used herein for convenience only and is not to be taken as a limitation on the embodiments of the systems and methods for string lighting system. In many embodiments, the string lighting system includes a lighted rod and a light source. This light source is many times an LED system that is battery powered. Additionally, the lighted rod, in many alternatives, terminates with a loop, hook, or other aperture.

Figure 1:
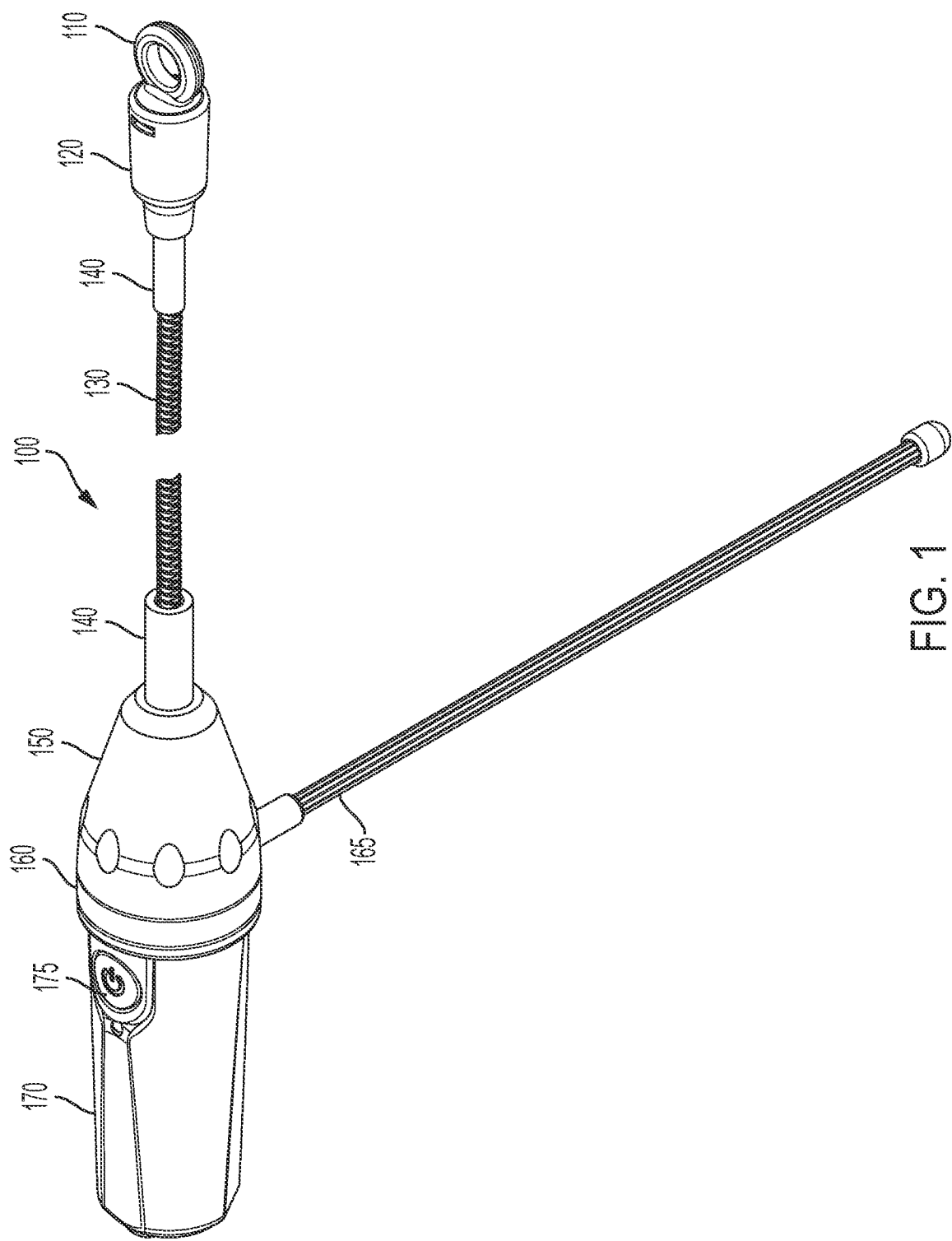
FIG. 1 shows one embodiment of a string lighting system.

FIG. 1 shows one embodiment of a string lighting system 100. String lighting system 100 a ring end 110. Ring end 110 provides for interconnection to various elements and may therefore may be hung on a hook or other protrusion or tied into a rope or other item. This allows for lighted rod 130 to be extended over a distance and secured and therefore used to light a large area. In many embodiments, lighted rod 130 is a fiber optic solid rod. Other options for lighted rod 130 are possible, however, generally a rod that will transmit light over the length of the rod are desirable. For example, a generally plastic transparent tube may be utilized. Various options will be apparent to those of ordinary skill in the art. The lighted rod 130 may be any length, but is usually on the order of meters long. The break in the lighted rod 130 is to suggest that it could be of any length and an actual embodiment will not have a break in the lighted rod in most scenarios. The lighted rod is shown as broken in the middle denoting that the rod may be a variety of lengths. Typically, lighted rod 130 may be held in place via PVC shrink tube 140 located on either end of the lighted rod 130. The PVC shrink tube 140 on one end of the device fits into the holder 120 for ring end. As will be explained later, holder 120, ring end 110 and shrink tube 140 cooperate to hold lighted rod 130 in place. On the other end of lighted rod 130, another shrink tube cooperates with the light module end 150 to hold the lighted rod 130 in place. Additionally, a ring 160 attached to a rubberized twist tie 165 surrounds the body of the lighting module. The lighting module includes a two-piece body, light module end 150 and light module main body 170. Additionally, a switch 175 is included for operation of the device. The shown configuration is exemplary. In many embodiments, the string lighting system includes a lighted rod that is attached to a lighting module. The lighting module generally has a connection mechanism as does the end of the lighted rod. Through these two connection mechanisms the device may be attached over a span area. In many configurations, the attachment mechanism on the lighting module may be a rubberized twist tie, however other interconnection systems are possible, including but not limited to clamps, clips, Velcro, carabiners, magnets, adhesives, hooks, etc. In many configurations, the end of the lighted rod includes loop for hooking on objects, however, many other possible interconnection devices may be used including but not limited to clamps, clips, Velcro, carabiners, magnets, adhesives, hooks, etc. Additionally, in some configurations, the lighted rod may have a rubberized twist tie or other interconnection device (as explained above) is located along the length of the rod. Additionally, although rubberized twist tie 165 is shown as a particular length, any length may be used.

Figure 4:
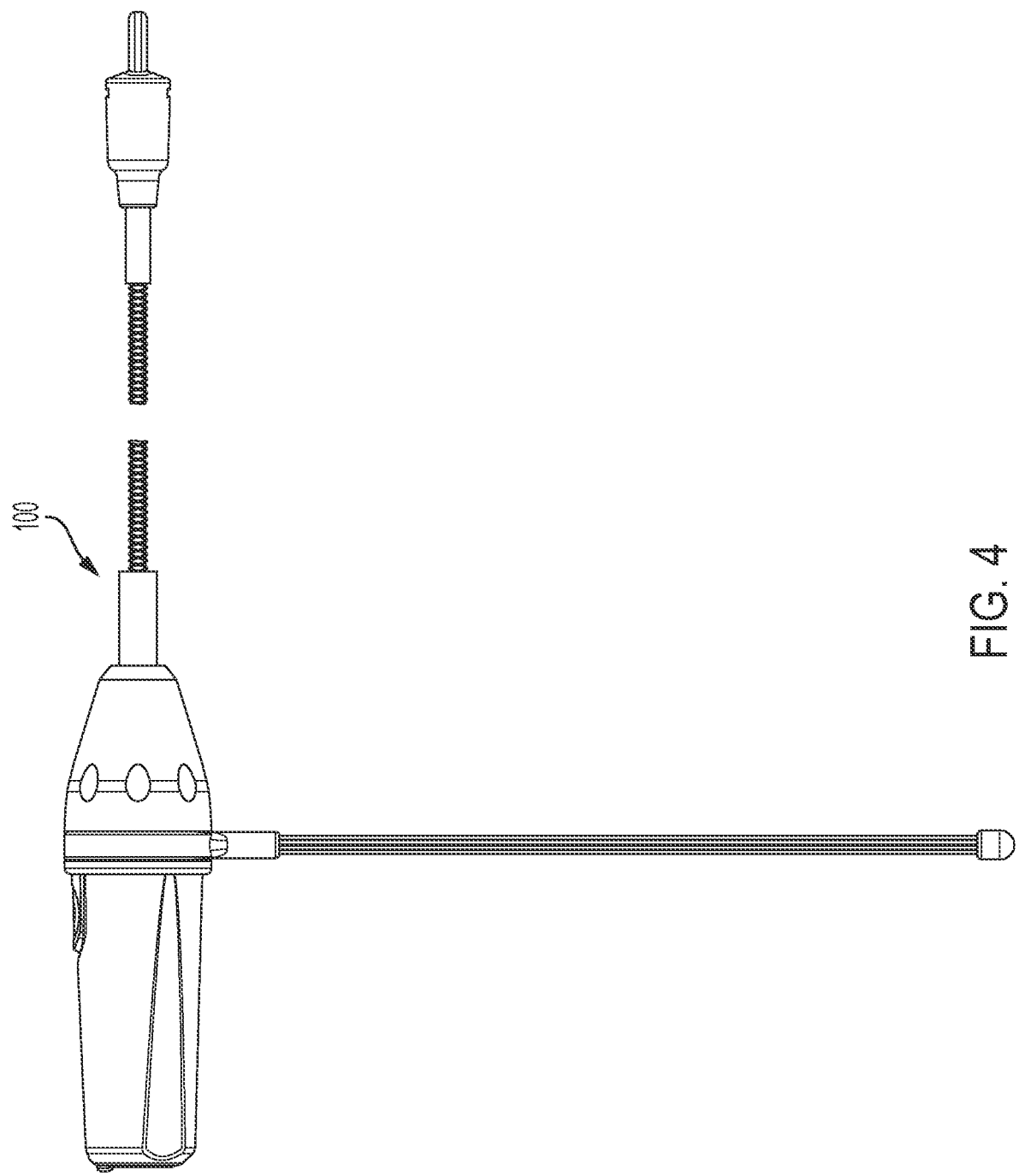
FIG. 4 shows a right-side view of lighting system of FIG. 1.
Figure 5:
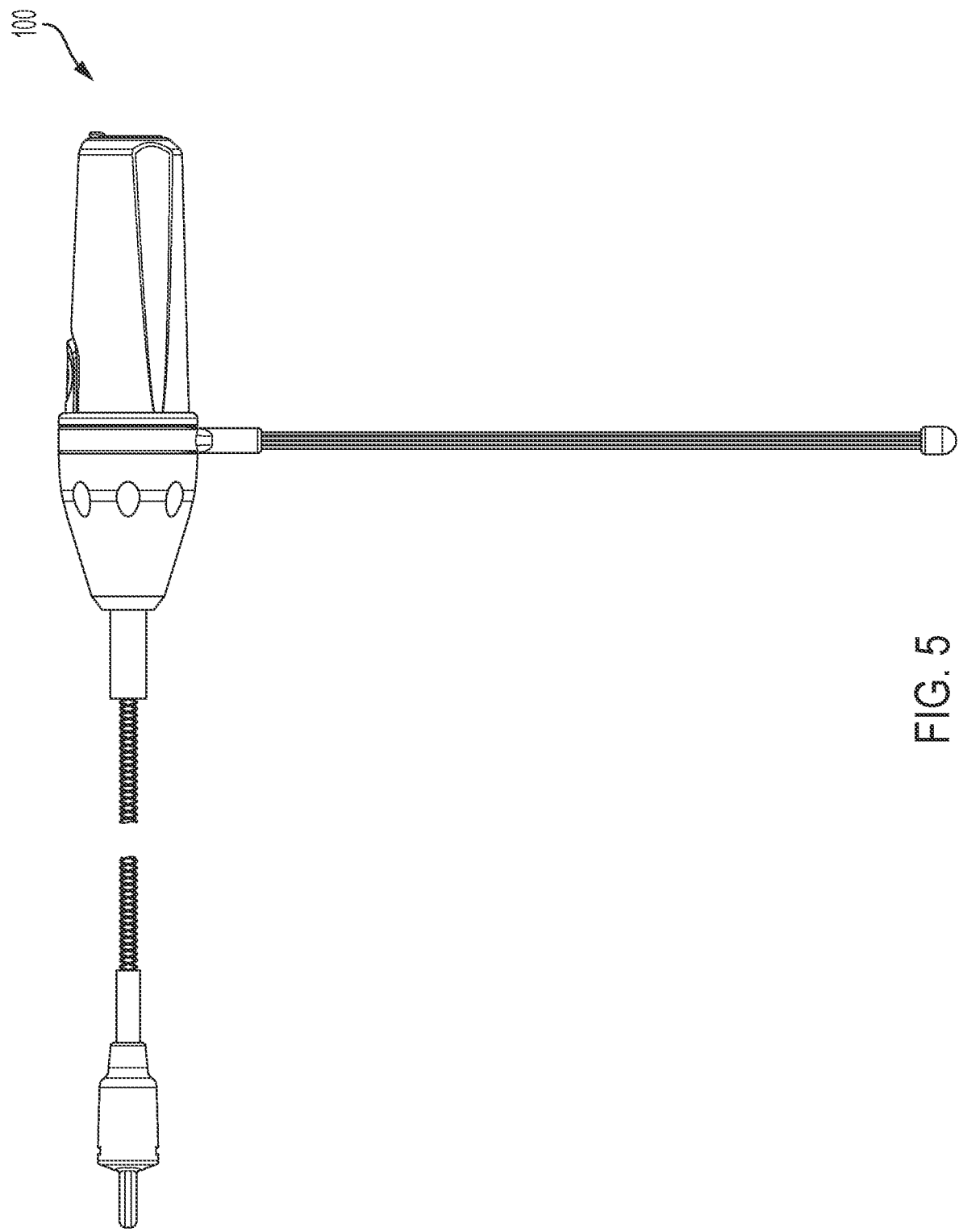
FIG. 5 shows a left side view of lighting system of FIG. 1.
Figure 6:
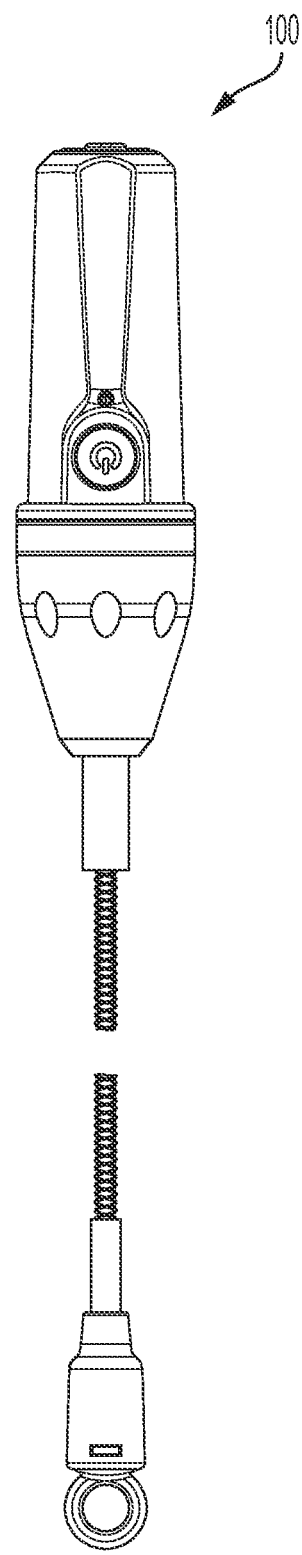
FIG. 6 shows a top view of lighting system of FIG. 1.
Figure 7:
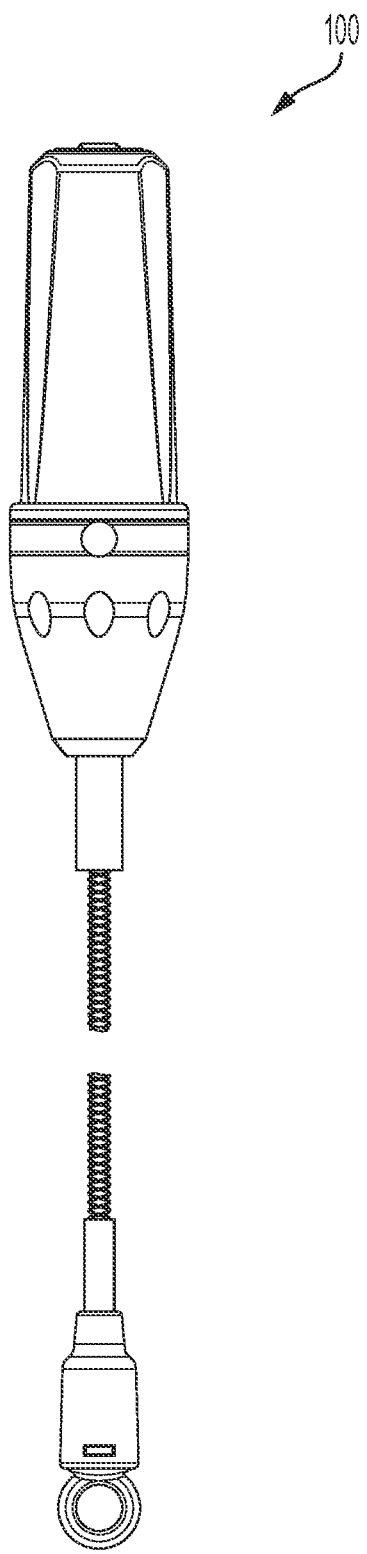
FIG. 7 shows a bottom view of lighting system of FIG. 1.

FIG. 2 shows a front view of lighting system 100. FIG. 3 shows a rear view of lighting system 100. FIG. 4 shows a right-side view of lighting system 100. FIG. 5 shows a left side view of lighting system 100. FIG. 6 shows a top view of lighting system 100. FIG. 7 shows a bottom view of lighting system 100.

Figure 8:
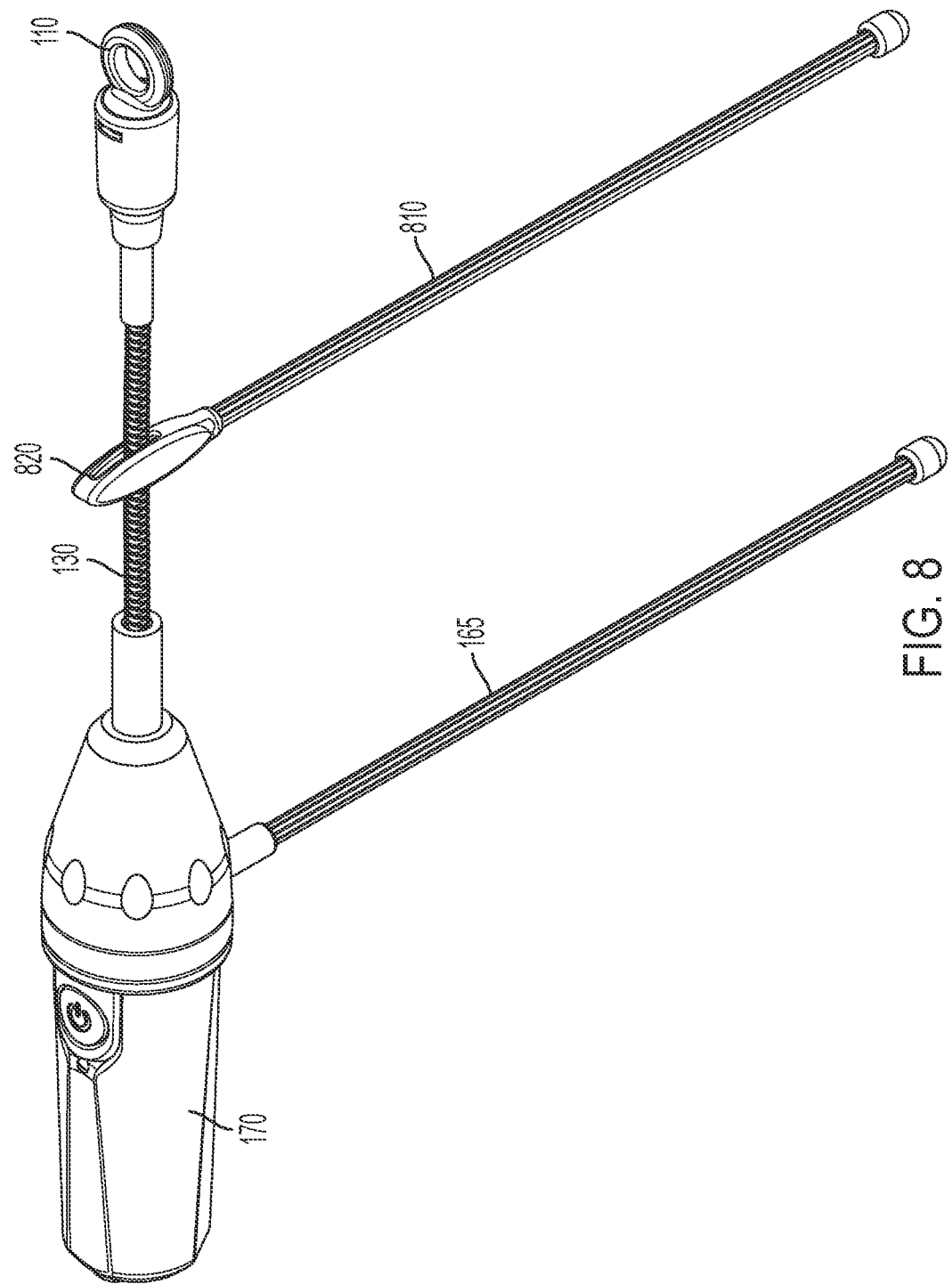
FIG. 8 shows lighting system of FIG. 1 with an additional rubberized twist tie located on the length of the lighted rod.

FIG. 8 shows lighting system 100 with an additional rubberized twist tie 810 located on the length of the lighted rod 130. Twist tie 810 includes a rubberized end 820 with a friction fit/stretchy end having an aperture for lighted rod 130. This allows an additional connection point for the lighting system 100. Additional twist ties may be included along the length of the lighted rod. No break is shown in lighted rod 130, however the rod could be of any length.

Figure 9:
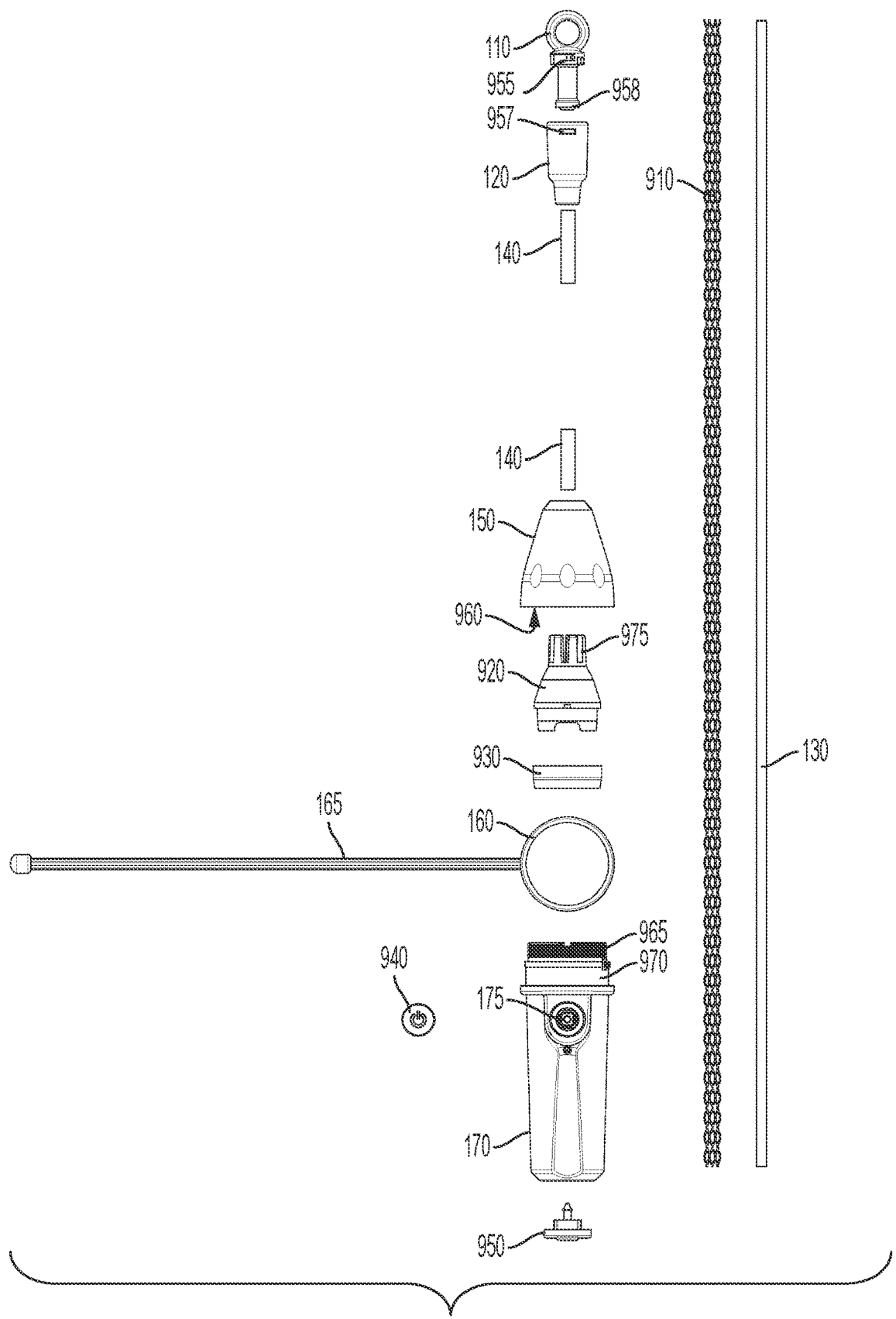
FIG. 9 shows an exploded view the lighting system of FIG. 1.

FIG. 9 shows an exploded view of lighting system 100. In this view the various pieces of the device are visible. The internal nylon mesh 910 that fits outside the lighted rod 130 is visible in FIG. 9. This nylon mesh 910 imparts strength and resiliency to the lighted string of the device. Additionally, the woven nylon provides a material for the light shined down the lighted rod to bounce off of in order to provide more light scattering. Nylon mesh 910 fits over lighted rod 130. Lighted rod 130 is held in place in both ends of the lighting system using PVC shrink tube 140. In operation, the device is interconnected and the PVC shrink tubes 140 are heated such that tubes shrink and fit around the lighted rod 130 holding the device together. PVC shrink tube 140 cooperates with mounting piece 920, which includes a friction and/or pressure fit end 975, which fits around PVC shrink tube 140 and into light module end 150. The combination between the pressure fit end 975 and the light module end 150 applies compressive and friction force to the PVC shrink tube 140 and lighted rod 130, holding them in place. Additionally, silicone ring 930 fits around the base of mounting piece 920 in order to hold the module and support pieces in place. In operation in some configurations, the end of light module end 150 compresses pressure fit end 975 around PVC shrink tube and lighted tube. This may be referred to a pressure fit system and utilizes two rigid bodies that capture and compress the nylon and rod between them, therefore holding them in place. Silicone ring 930 provides for sealing of the circuitry system inside of the light module main body 170 in a watertight fashion. Additionally, the threaded area of light module main body 170 screws into light module end 150. Light module main body 170 provides a ring mounting area for mounting ring 160 of rubberized twist tie 165. Additionally, lighting system includes a silicone button 940 as well as a bottom cap 950 for sealing the device. Bottom cap 950 covers a charging port in many embodiments. The way in which the top portion of the lighted rod 130 includes the upper PVC shrink tube 140. Additionally, ring end 110 includes lip 958 and a protrusion 955 that mates with catch 957 in order to hold PVC shrink tube and lighted rod 130 in a pressure and/or friction arrangement. This arrangement occurs when lip 958 presses into the inner area holder 120, such that it is forced down into the neck portion of holder 120, pressing lighted rod and nylon mesh 910 such that they are captured between. Such a pressure fit system provides for two rigid bodies that compress the mesh and the rod such that they are captured. In this case the rigid bodies approximate rings, however may be any shape.

FIGS. 10A-10E show one embodiment of a lighting module 1010 for lighting system 100. Lighting module 1010 includes a charging port 1020, a LED 1040, a switch 1026, and an indicator light 1025 that indicates when the device is charging. Additionally, a mounting platform 1050 provides a standard fit into the main body of the lighting system 100 and assists with the positioning of the LED 1040. In many configurations, the LED is oriented such that it shines light down the lighted rod 130. The lighted rod may have some degree of internal reflection, such that light travelling approximately parallel to the rod is internally reflected/refracted. The nylon woven support in such a scenario may scatter or change the direction of the light such that it is not internally reflected. In many scenarios, the LED 1040 primarily projects light along the lighted rod 130. The LED 1040 may have primary direction of light emission in line with the lighted rod 130. Charging port 1020 is the configuration shown is a USB charging port. Additionally, the device includes a power source such as a battery, which in the configuration shown is rechargeable. Other circuitry included provides for the operation and logic of the device and may vary from embodiment to embodiment.

Numerous variations of the above configurations are possible. In many embodiments, the lighting system provides a long lit string of translucent or transparent material, through which light may be shined. Additionally, the lit string provides support to the device when it is mounted. Therefore, a long rod of light is provided that may even light a large area with a minimal lighting source. Typically, such areas may be long and narrow areas, such as a tent, however, alternative configurations are possible, since the lighted string may be encircled or oriented in a variety of shapes and configurations for lighting almost any area. The nylon outer portion provides strength to the string/rod that carries the light. The nylon serves the double purpose of defecting or spreading the light as it travels down the rod as well. Since, in many configurations, LEDs provide semi directionally light, most light will travel down the rod unless the incident angle to the rod is great, in which case it will be emitted outside of the tube. As indicated the nylon outer portion assists in redirecting light such that its direction of travel is not close to parallel to the lighted rod. The result of this configuration is that the rod appears to be approximately evenly lit along its length.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A lighting system comprising:
   a body portion;
   a light source;
   a rod interconnected with the light source;
   a support located outside of the rod, providing strength to the rod and light scattering of light provided by the light source; and
   a rubberized twist tie attached to a mounting ring surrounding the body portion.

2. The lighting system of claim 1, wherein a first end of the rod is connected to an interconnection device and a second end of the rod is connected to the light source.

3. The lighting system of claim 2, wherein the light source is housed in the body portion and the body portion includes a second interconnection device.

4. The lighting system of claim 3, wherein the interconnection device is a ring.

5. The lighting system of claim 1, wherein the body portion provides a ring mounting area for the mounting ring of the rubberized twist tie.

6. The lighting system of claim 1, further comprising a second rubberized twist tie located on the rod.

7. The lighting system of claim 6, wherein the rod is flexible.

8. The lighting system of claim 7, wherein the body portion includes a recharging port.

9. The lighting system of claim 8, wherein the support is a woven nylon support that is flexible and stretchable.

10. The lighting system of claim 1, wherein the body includes a pressure fit system that captures the rod and the support holding the rod and the support in place.

11. The lighting system of claim 10, wherein the first interconnection device includes a pressure fit system that captures the rod and the support holding the rod and the support in place.

12. The lighting system of claim 11, wherein a first and second piece of shrink fit material surround and seal the rod and support to the body and first interconnection device.

13. The system of claim 1, wherein the lighting device is an LED, and the LED has a predominate direction of light emission, the predominate direction of light emission aligned with a length of the rod.

14. A method of lighting an area, the method comprising:
   providing a lighting device, the lighting device comprising:
      a body portion housing a light source;
      a rod interconnected with the light source;
      a support located outside of the rod, providing strength to the rod and light scattering of light provided by the light source; and
      a rubberized twist tie connected to a mounting ring surrounding the body portion;
   stretching the rod along an area to be lit; and
   interconnecting the lighting device to a mount along the area to be lit.

15. The method of claim 14, wherein the lighting device further includes an interconnection ring, the interconnection ring located on a first end of the rod, the method further comprising:
   using at least one of the ring or the rubberized twist tie to perform the interconnecting.

16. A lighting apparatus comprising:
   a flexible rod having a long length in relation to a width of the flexible rod;
   a support, running the long length of the flexible rod;
   a body portion housing a lighting module interconnected with the flexible rod and the support, the lighting module including a light source, the light source oriented to project light down the flexible rod; and
   a rubberized twist tie attached to a mounting ring surrounding the body portion.

17. The lighting apparatus of claim 16, wherein the lighting module includes a battery and a charging port, the battery for powering the light source.

18. The lighting apparatus of claim 17, wherein the lighting module captures the flexible rod and the support using a pressure fit system, providing a first and second piece squeezing together to capture the flexible rod and the support.

19. The lighting system of claim 18, further comprising an interconnector located at a first end of the flexible rod.

20. The lighting system of claim 19, wherein the support is made of woven material, the woven material providing support to the rod and scattering light from the light source.

21. The lighting system of claim 20, wherein the flexible rod is permeable to light.

* * * * *